United States Patent [19]
Andrews et al.

[11] Patent Number: 5,832,360
[45] Date of Patent: Nov. 3, 1998

[54] BOND FOR ABRASIVE TOOL

[75] Inventors: Richard M. Andrews, Westborough; Bradley J. Miller, Westboro, both of Mass.; Marcus R. Skeem, Sandy, Utah; Ren-Kae Shiue, Taipei, Taiwan

[73] Assignee: Norton Company, Worcester, Mass.

[21] Appl. No.: 920,242

[22] Filed: Aug. 28, 1997

[51] Int. Cl.[6] .................................................. B22F 3/00
[52] U.S. Cl. ..................... 428/552; 428/553; 428/627; 428/634; 75/255; 419/9; 419/11; 228/122.1
[58] Field of Search ..................... 75/247, 255; 420/470, 420/492; 419/9, 11; 428/627, 634, 552, 553; 228/122.1

[56] References Cited

U.S. PATENT DOCUMENTS

| | | | |
|---|---|---|---|
| 2,828,197 | 3/1958 | Blackmer, Jr. . | |
| 3,178,273 | 4/1965 | Libal | 51/293 |
| 3,306,720 | 2/1967 | Darrow | 75/247 |
| 3,596,649 | 8/1971 | Olivieri | 125/11 |
| 3,779,873 | 12/1973 | Dewar | 204/20 |
| 3,869,259 | 3/1975 | Lindsey | 29/182.8 |
| 3,894,673 | 7/1975 | Lowder et al. | 228/122 |
| 3,923,558 | 12/1975 | Shapiro et al. | 148/32.5 |
| 3,925,035 | 12/1975 | Keat | 51/309 |
| 4,018,576 | 4/1977 | Lowder | 51/309 |
| 4,116,689 | 9/1978 | Kaarlela | 75/229 |
| 4,295,885 | 10/1981 | Kaarlela | 75/208 R |
| 4,334,895 | 6/1982 | Keat | 51/309 |
| 4,471,026 | 9/1984 | Nicholas et al. | 428/450 |
| 4,618,349 | 10/1986 | Hashimoto et al. | 51/298 |
| 4,685,440 | 8/1987 | Owens | 125/11 |
| 4,951,427 | 8/1990 | St. Pierre | 51/293 |
| 4,968,326 | 11/1990 | Wiand | 51/293 |
| 5,011,511 | 4/1991 | Beck | 51/295 |
| 5,087,529 | 2/1992 | Engel et al. | 428/552 |
| 5,102,621 | 4/1992 | Sara | 420/470 |
| 5,178,643 | 1/1993 | Schimweg | 51/293 |
| 5,232,469 | 8/1993 | McEachron et al. | 51/295 |
| 5,308,367 | 5/1994 | Julien | 51/293 |
| 5,385,591 | 1/1995 | Ramanath et al. | 51/309 |
| 5,453,105 | 9/1995 | Middlemiss et al. | 51/307 |
| 5,492,771 | 2/1996 | Lowder et al. | 428/565 |
| 5,505,750 | 4/1996 | Andrews | 51/309 |
| 5,518,519 | 5/1996 | Kondoh et al. | 75/231 |

FOREIGN PATENT DOCUMENTS

| | | | |
|---|---|---|---|
| 1086509 | 7/1977 | Canada | B24D 3/10 |
| 480878 | 10/1991 | European Pat. Off. | B24D 3/06 |
| 8229825-A | 2/1995 | Japan | B24D 3/06 |
| 8229826-A | 2/1995 | Japan | B24D 3/06 |

OTHER PUBLICATIONS

R.B. Aronson, "CBN Grinding — a tempting technology", Manufacturing Engineering, Feb. 1994, p. 35.

J.A. Borkowski and A.M. Szymanski, "Uses of Abrasives and Abrasive Tools", Ellis Horwood Ltd., 1992.

M. M. Schwartz, "Brazing", ASM International, 1987.

G. Humpston and D.M. Jacobson, "Principles of Soldering and Brazing," ASM International, 1993.

M.M. Schwartz, "Ceramic Joining," ASM International, 1989.

"ASM Handbook," vol. 6, ASM International, 1993.

R.W.K. Honeycombe, Steels–Microstructure and Properties, 1996.

J.F. Elliott and M. Gleiser, Thermochemistry for Steelmaking, vol. 1., 1960.

H.K. Lee and J.Y. Lee, "Decomposition and Interfacial Reaction in Brazing of SiC by Copper–Based Active Alloys," Journal of Materials Science Letters, 11, 1992, pp. 550–553.

J. Wilks and E. Wilks, "Properties and Applications of Diamond," Butterworth–Heinemann Ltd., 1991.

Warnecke, G. and Wimmer J., "Stock Removal and Wear in Deep Grinding High–Performance Ceramics," Industrial Diamond Review, 55(566), pp. 126–132, 1995.

Murakawa, Masao; Takeuchi, Sadao; "Forming of a grinding wheel using a dresser with brazed diamond film", Materials Science & Engineering A: Structural Materials: Properties, Microstructure and Processing vA140n, Jul. 7, 1991 pp. 759–763.

Stasyuk, L.F.; Kizikov, E.D.; Kushtalova, I.P.; "Structure and Properties of a Diamond–Containing Composition Material with a Tungsten–Free Matrix for a Truing Tool", Metal Science and Heat Treatment, v 28 n Nov.–Dec. 1986 pp. 835–839.

Kushtalova, I.P.:Stasyuk, L.F.; Kizikov, E.D.; "Development of a Diamond Containing Material With a Tungsten–Free Matrix for Dressing Tools", Soviet Journal of Superhard Materials v 8 n 1, Nov., 1986 pp. 48–51.

Kirk–Othmer, Encyclopedia of Chemical Technology 4th Ed., vol. 4., 1991.

Tech. Service Bulletin of Tomei Diamond Tomei'Comprehensive Product Line Up, undated.

Tech. Service Bulletin of General Electric An Analysis of the Coated Diamond Bond System, undated.

Tech. Service Bulletin of De Beers Industrial Diamond Division De Beers–80 US Mesh Diamond Abrasives, 1985.

Tech. Service Bulletin of American Boarts Crushing Industrial Diamonds for the Petroleum Industry, undated.

Primary Examiner—Ngoclan Mai
Attorney, Agent, or Firm—Mary E. Porter

[57] ABSTRACT

A bond for a single layer metal bond abrasive tool can be easily chemically and electrochemically stripped from the metal core of a recovered used tool to facilitate reuse of the core. Relative to conventionally bonded tools, the speed of stripping the novel bond is quick, and the stripped core has a smooth, clean surface which needs only minimal mechanical repair prior to reuse. In one aspect, the novel bond consists essentially of a ternary bond composition of copper, tin and titanium, in which the copper and tin are pre-alloyed and the pre-alloy and titanium component are incorporated in the bond composition as fine particle size powders. In another aspect, the bond is a quaternary bond composition consisting essentially of copper, tin, titanium and silver. The powder components can be used dry or mixed with a fugitive liquid binder as a paste. The novel bond can be brazed at lower temperature than copper/tin/titanium bonds prepared otherwise. The bond composition forms a good melt at braze temperature that flows smoothly, evenly over a tool preform and provides consistent quality bonding of abrasive from tool to tool.

20 Claims, No Drawings

BOND FOR ABRASIVE TOOL

FIELD OF THE INVENTION

This invention relates to a bond for attaching grit to the core of an abrasive tool. More specifically it relates to a bond which can be easily removed to facilitate reuse of the core.

BACKGROUND AND SUMMARY OF THE INVENTION

Industrial abrasive tools often include abrasive grains of a hard substance affixed to a rigid core. The core can be adapted to be manually or power driven in moving contact with a work piece to grind, cut, polish or otherwise abrade the work piece to a desired shape. The abrasive grains are usually attached to the core by a material sometimes called a bond.

The cutting ability of abrasive tools generally diminishes with continued use. Ultimately, a tool wears so much as to become ineffective for further use and should be replaced with a fresh one. Often the wear causing reduced cutting ability is due to reasons such as excessive dulling and loss of the abrasive grit. The grit can be lost when the bond erodes or fractures through contact with the work piece. In many cases, only the abrasive and bond are affected by wear and the core remains substantially intact.

The need to replace worn out abrasive tools is important in certain aggressive cutting applications such as in construction material and industrial grinding. These applications typically involve grinding materials such as metals, natural stone, granite, concrete, organic composites, and ceramics, and mixtures of them. These difficult-to-cut materials tend to rapidly wear out even the most durable abrasive tools which incorporate superabrasive grits, such as diamond and cubic boron nitride ("CBN"). Additionally, construction grinding abrasive tools are frequently quite large. Abrasive wheels of up to several feet in diameter for cutting concrete and other roadway materials are not uncommon. The cost of replacing such tools can be quite high.

To reduce replacement cost, it is usually possible to recondition the core recovered from a worn out tool. This is generally accomplished by removing any residual bond and grit on the core, repairing structural defects in the core and applying a new cutting surface of abrasive grit and bond. Removal of bond and grit from recovered abrasive tools is sometimes referred to as stripping.

Stripping is especially important for recovery of industrial grinding tools because industrial projects largely demand grinding to fine tolerances. Residual bond material should be completely removed from a used core to obtain dimensional precision suitable for industrial grinding. Of course, stripping also is important in construction grinding.

Many techniques such as scouring and heating may be used to strip recovered cores. Abrasive tools which employ a metal bond are usually stripped by a combination of chemical and electrochemical processes. That is, the tool may be immersed in a chemical bath which is selectively corrosive to the composition of the bond. A suitable electrical circuit may be applied in a manner which further strips the bond from the core by reverse electroplating.

While significant for many abrasive tool types, the ability to strip the core is particularly important in the development of bonds for so-called Single Layer Metal Bond ("SLMB") type tools. SLMB tools basically are made by applying the grit and a thin coating of a bonding material to the cutting surface of the core. Finally, a bond between the grit and the core is brazed by heat treating the assembly.

Nickel is a component in traditional bonds that can be readily stripped from the core. However, nickel-containing bond materials usually braze at very high temperature, typically well above 1000° C. causing adverse effects. In this temperature range diamond particles graphitize, and sometimes even the core metal distorts. Alternatively, nickel bonds can be effected by electroplating. This process suffers from the drawback that electroplating baths use large volumes of abrasive grit dispersed in the plating liquid. If the grit is diamond or CBN, the plating bath becomes excessively expensive to maintain. Electroplated bonds also do not perform as well as so-called "active" bonds, discussed below, that is, the bonds are not as strong and grains dislodge from the tool more easily. This poor performance is understood to stem from the lack of chemical interaction between the electroplated bond composition and the abrasive grain material.

Active bond alloys which include chemically active components such as titanium have gained popularity in the field of bonds for SLMB tools. Wesgo, Inc. of Belmont, Calif. offers a bond based on copper-silver eutectic with 4.5 wt % titanium under the Ticusil tradename. Although this product provides an easily stripped bond, it is relatively expensive due to the silver content, and its performance in service is moderate.

U.S. Pat. No. 5,102,621 discloses a ternary brazing alloy consisting essentially of 0.5–10 wt % titanium, 10–50 wt % tin and the balance copper. The brazing alloy is directed to forming a brazed joint between a graphite or carbon body and a metal member, primarily in the electronics industry to braze graphite electrodes to copper conductors. The braze alloy was prepared by blending appropriate amounts of copper, tin and titanium and heating the mixture in a crucible. This reference indicates that the braze alloy wets and forms good bonds to graphite.

A preferred SLMB bond alloy has the composition 70 Cu/21 Sn/9 Ti (wt %). The three metal powders can be blended with a liquid binder to obtain a paste. A bond formed by applying the paste to a metal core, depositing abrasive particles in the paste and brazing the alloy at high temperature is strong but unfortunately, is not readily strippable by chemical and electrochemical methods. Such Cu/Sn/Ti-containing bond compositions are thought to strip poorly because (a) tin-bearing intermetallic phases within the bond are resistant to corrosion by stripping chemicals, and (b) a Ti/Fe/Cu/Sn intermetallic phase is formed which strongly adheres the bond to the core. Tin and titanium are melting point depressants for the alloy and titanium reacts with carbon which beneficially causes the molten bond to wet diamond grit during brazing. Therefore, simply reducing the amount of tin and titanium in the composition to improve stripping ability is undesirable.

Cu/Sn/Ti bonds for brazing have traditionally been made by mixing together powders of the three individual components to obtain a uniformly concentrated blend. This process advantageously gave the manufacturer excellent control over the final bond composition because the amount of each of the components could be adjusted separately. It has been discovered that the bond made by a two step method involving first combining the copper and tin components in a bronze alloy, and secondly mixing a powder of the bronze with an appropriate amount of titanium hydride powder, is highly effective for SLMB bonds and is much more strippable than the traditional Cu/Sn/Ti bonds.

Accordingly, the present invention provides a strippable bond composition for an abrasive tool having a predominantly iron core consisting essentially of:

(a) about 85–95 wt % bronze alloy of about 5.6–41.2 wt % tin and about 58.8–94.6 wt % copper; and (b) about 5–15 wt % titanium.

There is also provided an abrasive tool having abrasive grit bonded to a predominantly iron core by a braze of the aforementioned strippable bond composition.

This invention additionally provides a method of bonding an abrasive grit to a tool having a predominantly iron core, comprising the steps of:

(1) blending to a uniform mixture a powder of bronze alloy consisting essentially of about 5.6–41.2 wt % tin and a complementary amount of copper; and a powder of titanium hydride; wherein the powders are present in proportions effective to obtain a bond composition consisting essentially of
   (i) about 50–90 wt % copper;
   (ii) about 5–35 wt % tin; and
   (iii) about 5–15 wt % titanium;

(2) placing abrasive grains and the bond composition on a cutting surface of the core;

(3) heating the bond composition to an elevated temperature below a brazing temperature of at most about 870° C. in a substantially oxygen free atmosphere the heating being effective to cause the titanium hydride to dissociate to elemental titanium; and (4) further heating the bond composition to the brazing temperature for a duration effective to liquefy a major fraction of the composition.

In another aspect this invention involves the discovery that incorporation of some silver with an activated ternary portion of copper, tin and titanium can produce a strong, yet readily strippable bond for adhering abrasive grit to a metal core abrasive tool. Thus according to the present invention there is also provided a strippable bond composition for an abrasive tool having a predominantly iron core consisting essentially of
   (i) about 50–80 wt % copper;
   (ii) about 15–25 wt % tin;
   (iii) about 5–15 wt % titanium, and
   (iv) about 2–150 parts by weight ("pbw") silver per 100 pbw of the total of (i)–(iii),
wherein the weight percentages are based on the total of (i)–(iii).

Still further the present invention provides a method of bonding an abrasive grit to a tool having a predominantly iron core, comprising the steps of:

(1) blending to a uniform mixture a bond composition consisting essentially of
   (i) about 50–80 wt % copper;
   (ii) about 15–25 wt % tin;
   (iii) about 5–15 wt % titanium; and
   (iv) about 2–150 pbw of silver per 100 pbw of the total of (i)–(iii);
wherein the weight percentages are based on the total of (i)–(iii); and (2) placing abrasive grains and the bond composition on a cutting surface of the core; and (3) heating the bond composition to a brazing temperature of at most about 870° C. in a substantially oxygen-free atmosphere for a duration effective to liquefy a major fraction of the composition.

Yet further there is provided a single layer metal bonded tool comprising (a) a predominantly iron core; and (b) abrasive grit bonded to the core by a brazed bond composition consisting essentially of
   (i) about 50–80 wt % copper;
   (ii) about 15–25 wt % tin;
   (iii) about 5–15 wt % titanium; and
   (iv) about 2–150 pbw of silver per 100 pbw of the total of (i)–(iii);
wherein the weight percentages are based on the total of (i)–(iii).

DETAILED DESCRIPTION

In one aspect, the invention is a strippable bond for a predominantly iron core abrasive tool which employs a bond composition largely of copper, tin and titanium. Occasionally herein, the term "bond composition" is used to designate the composition of the mixture of components which constitute the bond. The term "bond" means the fused bond after heat or other treating of the bond composition to fix abrasive grains to the tool. As used herein, the term "predominantly iron core" means a core of metal composition in which elemental iron is a substantial component. Predominantly iron core is intended to embrace cores of elemental iron and iron alloys, such as carbon steel and stainless steel, which may contain minor but significant proportions of nickel, chrome, molybdenum, chromium, vanadium, tungsten, silicon, manganese and mixtures thereof, for example.

The grains that are bonded to the metal core can be any suitably hard, granular particulate abrasive material. Representative abrasives which can be used in this invention include aluminum oxide, silicon carbide, tungsten carbide, and the like. Aluminum oxide encompasses standard alumina abrasive as well as the so-called, seeded and unseeded sol-gel microcrystalline alpha-alumina. Particular preference is given to use of the very hard abrasive substances generally known as superabrasives. These include diamond, cubic boron nitride and mixtures of them. Among these, diamond is preferred, primarily for cutting nonferrous materials.

To provide the desired strippability of the bond from the metal core, the copper, tin and titanium are present in the bond composition as two components, namely, a bronze alloy and titanium. Amounts of copper and tin are complementary to a total of 100%. The bronze alloy preferably consists essentially of about 50–90 wt % copper and about 5–35 wt % tin; more preferably, about 70–90 wt % copper and about 10–30 wt % tin; and most preferably about 75–77 wt % copper and 23–25 wt % tin.

The titanium ingredient preferably contains titanium in a form which can react during brazing with a superabrasive, particularly diamond. This reactivity improves the ability of the molten brazing composition to wet the surface of the abrasive grains. The resulting enhanced compatibility between bond and superabrasive is believed to promote adhesive bond strength. The titanium can be added to the mixture either in elemental or compound form. Elemental titanium reacts with water and or oxygen at low temperature to form titanium dioxide and thus becomes unavailable to react with diamond during brazing. Therefore, adding elemental titanium is less preferred when water or oxygen is present. Water can be introduced as a constituent or contaminant of an optional, liquid binder. If titanium is added in compound form, the compound should be capable of dissociation during the brazing step to permit the titanium to react with the superabrasive. Preferably titanium is added to the bond material as titanium hydride, $TiH_2$, which is stable up to about 500° C. Above about 500° C., titanium hydride dissociates to titanium and hydrogen.

Both bronze alloy and titanium components preferably are incorporated into the bond composition in powder form. The powders should have a small particle size. This helps to produce uniform mixture and homogenous concentration throughout the bond composition for optimum wetting of the abrasive grains during brazing and for development of maximum bond strength between the core and grains. The fine particle size also facilitates formation of a bond composition paste as will be explained below. Fine particles of maximum dimension of about 44 $\mu$m is preferred. Particle size of the metal powders can be determined by filtering the particles through a specified mesh size sieve. For example, nominal 44 $\mu$m maximum particles will pass through a 325 U.S. standard mesh sieve. The minimum metal particle size is not particularly critical in the brazed tool. It is generally limited by the expense of producing ultra-fine particles.

The powdered metal components preferably should be present in the bond composition in the ranges of about 5–15 wt % titanium, and about 85–95 wt % bronze alloy. More preferably, the combination of bronze alloy composition and concentration of titanium should result in a bond composition of about 70 wt % copper, about 21 wt % tin and about 9 wt % titanium. As mentioned, preference is given to incorporating the titanium component in the form of titanium hydride. For many applications of the bond composition of this invention, the slight difference between the molecular weight of elemental titanium and titanium hydride can be neglected. However, for sake of clarity it is observed that the compositions stated herein refer to the titanium present, unless specifically indicated otherwise.

The bond composition is prepared by mixing the dry powder ingredients, for example, by tumble blending, until the concentrations of components are uniform throughout the mixture. The powder mixture can be applied directly on the cutting surface of the tool core. Preferably, the dry powder components are mixed with a generally low viscosity, fugitive liquid binder. The binder is added to the powdered ingredients in effective proportion to form a viscous, tacky paste, for example of the consistency of tooth paste. In paste form, the bond composition can be accurately dispensed and should be adhesive to the cutting surface of the core and to the abrasive grains. The term "fugitive" means that the liquid binder has the ability to vacate the bond composition at elevated temperature, preferably below brazing temperature and without adversely impacting the brazing process. The binder should be sufficiently volatile to substantially completely evaporate and/or pyrolyze during brazing without leaving a residue that might interfere with the function of the bond. Preferably the binder will vaporize below about 400° C. However, the binder volatility should be low enough that the paste remains fluid and tacky at room temperature for a reasonable time ("drying time") to apply the bond composition and abrasive to the core and to prepare the tools for brazing. Preferably the drying time should be about 1–2 hours. Liquid binders suitable to meet the parameters of the novel bond composition are commercially available. Representative paste-forming binders suitable for use in the present invention include Braz™ gel from Vitta Company; and Lucanex™ binder from Lucas Company. The latter is a proprietary composition and may need to be specially obtained as a paste already mixed by the vendor with bond composition components. The binder can be blended with the powders by many methods well known in the art such as ball milling. The order of mixing powders and liquid binder is not critical.

The paste is coated onto the core by any of the techniques well known in the art, such as brushing, spraying, doctoring or dipping the surface of the tool in the paste. For example, the paste can be coated onto the core with the aid of a turning machine. In fabrication of single layer metal bond abrasive tools, a layer of abrasive grains then is deposited on the coating of bond composition. The abrasive grains can be placed individually or sprinkled in a manner to provide even distribution over the cutting surface. The abrasive grains are deposited in a single layer, i.e., substantially, one grain thick. Particle size of the abrasive grains generally should be larger than 325 mesh, and preferably, larger than about 140 mesh.

The amount of paste applied is effective to provide a bond thickness specified to strongly hold the abrasive grains to the core. The proper amount of paste will depend somewhat on the size of the grains. Preferably, enough paste should be applied to produce a paste depth at least equal to, and more preferably, about 1.7 to about 2.3 times the maximum nominal dimension of the abrasive grains. For example, the maximum nominal dimension of a 140 mesh powder is 76 $\mu$m. Grains and powdered bond composition components alternatively can be applied by first depositing glue-coated abrasive grains directly on the metal core then covering the grains with metal powder mixture. The metal powder can optionally include a fugitive liquid binder. Very small particle size particles usually can be placed onto the grain laden core without a binder component.

The bond composition of mixed powder particles, and optionally, a liquid binder will densify upon brazing, described further below. One of ordinary skill in the art will be able to determine the amount of dry powder or paste to apply to the core to produce the desired thickness of brazed bond.

The bond according to the present invention is made by a brazing process that involves heating the powder mixture or paste ultimately to an elevated brazing temperature at which a major fraction of the solid components liquefy to and form a liquid solution that flows over the cutting surface of the tool. In the liquid state, the bond metals advantageously wet the surface of the abrasive grains very well. The good wetting ability is attributed in large part to the presence of the titanium which is surface active with abrasive materials, especially superabrasive diamond and CBN. It is also important to provide the beneficial high degree of bond strippability that the copper and tin are combined as a single pre-alloyed component prior to brazing. If the copper and tin are supplied as independent components, the tin will be expected to liquefy first at its low melting temperature of 232° C., while the copper and titanium remain solid. Once liberated as a liquid, tin will form an intermetallic phase with the iron of the core that both weakens the final bond and becomes more difficult to remove by chemical or electrical stripping methods. The tin-containing intermetallic weakens the bond by forming an additional, discontinuous component within the bond. It also reacts with titanium which consumes a portion of the titanium available in the bond composition, thereby leaving less titanium to promote wetting of the abrasive grains.

It has also been observed that the liquid solution of pre-alloyed copper/tin plus titanium or titanium hydride powder bond composition flows over the core and grains more smoothly, evenly and consistently, i.e., without blotches and morphological irregularities, than otherwise. Still further, the bond composition of the present invention liquefies at a slightly lower temperature than a ternary powder blend. This allows the braze process to be run cooler, which preserves the integrity of the core and grains better and also saves energy.

The braze temperature of copper/tin/titanium bond compositions according to the present invention can be as high as about 880° C., which is near the brazing temperature of ternary powder blends. However, the pre-alloyed copper/tin and titanium binary can braze effectively below about 870° C., preferably between 850° and 870° C., and more preferably, at about 865° C. When the titanium component is incorporated in the bond composition as titanium hydride, heating to braze temperature should be programmed at a rate suitable to allow the hydride to disassociate fully before reaching braze temperature. Further, the fugitive binder, if any is present, will also leave the bond composition during the heating steps. The binder can vacate the bond by different mechanisms. Higher volatility fractions may vaporize at lower temperatures, and low volatility fractions may pyrolize as temperature approaches the brazing temperature.

The atmosphere of the brazing process should be controlled to eliminate oxygen that can react with the metals present. Control can be accomplished by brazing under vacuum or in an inert gas purged environment preferably effective to maintain oxygen concentration below about 100 part per million (ppm). The brazing should be maintained at the bronze melting temperature for a duration sufficient to melt a major fraction of the bronze alloy and titanium and to extensively wet the surface of the grains, particularly when a superabrasive is employed. Fifteen minutes at bronze melting temperature is often sufficient and thirty minutes is preferred.

In another aspect, this invention provides a strong, durable and otherwise effective bond in an SLMB tool with greatly enhanced stripping property obtained from a quaternary composition of copper, tin, titanium and silver. While not wishing to be limited to a particular theory, the present inventors have found that silver is an easy metal to strip from a bond brazed to an iron-containing substrate. Tin is the most difficult of copper, tin and titanium to strip in that during brazing, tin tends to form intermetallics that adhere to the substrate and are more resistant to removal by electrochemical stripping. It has been discovered that adding silver to the copper, tin and titanium ternary affords a strong abrasive bond while replacing some of the tin with silver. Thus, strippability can be improved without sacrifice of bond strength.

The quaternary bond composition advantageously provides the further benefit that all of the four components can be incorporated in the bond composition individually in powder form. That is, copper, tin, titanium (preferably, titanium hydride) and silver powders can be blended to make the bond composition. Thus the manufacturer has great flexibility to easily produce any desired concentration of the four components by individually adjusting the proportion of each metal in the blend.

Although the four components can be blended as separate powders, preferably the bond composition can be produced from pre-alloys of two or more components and individual powders. For example, the bond composition of this invention can be made from blends of Cu/Sn pre-alloy and Ag and $TiH_2$, Cu/Sn/Ag pre-alloy, Cu/Sn pre-alloy and $TiH_2$; and Ag/Cu pre-alloy, Cu/Sn pre-alloy and $TiH_2$. Most preferably, the bond composition is made from a single quaternary pre-alloy of Cu/Sn/Ti/Ag component.

The copper, tin and titanium employed of the quaternary bond composition are substantially as previously described. As mentioned silver can be included either neat or in pre-alloy with other components. Preferably, all of the metal components, whether neat or pre-alloyed, are incorporated in the bond composition as powders and the particle sizes of the powders are similar to facilitate preparation of a uniformly concentrate mixture. Preference is given to particle size less than 44 μm, that is, the major fraction of all powders pass through a 325 mesh sieve.

The concentration of components in the novel bond composition is sometimes beneficially defined in terms of a uniform mixture of two portions, one being a ternary portion of copper, tin and titanium and the other silver. The ternary portion preferably consists essentially of about 50–80 wt % copper; about 15–25 wt % tin; and about 5–15 wt % titanium; and more preferably, about 65–75 wt % copper, about 18–22 wt % tin and about 5–15 wt % titanium, where the stated weight percentages are based upon the subtotal of Cu, Sn and Ti components. Preferably the silver portion should be present at about 5–135 parts by weight ("pbw") per 100 pbw of the ternary portion. Ability to strip the bond from a steel core improves with increasing silver content up to about 50 pbw per hundred pbw ternary portion. Above 50 pbw, stripping ability and bond strength are maintained but bond wear can deteriorate due to the enriched silver content. The cost of the bond also rises significantly. Above about 150 pbw per hundred, the bond loses strength in that abrasive grains are prone to dislodge prematurely during grinding. It has also been observed that excessive weight percentage of titanium in the ternary portion can cause the bond composition to braze to such a weak bond that abrasive grains become easily dislodged.

The bond composition can be applied in dry form or mixed with a liquid binder for application as a paste. The optional binder component is substantially as previously described. The process for making a quaternary composition bonded tool parallels the method of making the ternary composition bonded tool.

This invention is now illustrated by examples of certain representative embodiments thereof, wherein all parts, proportions and percentages are by weight unless otherwise indicated. All units of weight and measure not originally obtained in SI units have been converted to SI units.

EXAMPLES

Examples 1–11

Bond compositions were tested for bond performance and strippability. Various copper, tin, and silver alloy and titanium hydride powders were blended to uniform mixtures. Braz™ binder was stirred into the powder mixtures to make smooth, homogenous 25 wt % binder content pastes. Each paste was applied to separate test substrates as follows: A 0.25 mm thick stainless steel perforated sheet was held firmly in place on a clean flat steel plate of approximately 20 cm² surface area and 1.6 mm thickness. The paste was deposited on the exposed surface of the perforated sheet and forced into the perforation cavities with a hard rubber sqeegee. Diamonds of about 80 to 100 US standard mesh size (about 0.12–0.18 mm) were then dusted on the sheet covered plate. The sheet was carefully removed leaving diamond grains stuck in discretely placed dots of paste on the plate. Excess diamond was removed by inverting the plate.

The plates were heated at about 10° C. per minute to brazing temperatures under vacuum of less than 0.133 Pa ($<10^{-3}$ Torr) then allowed to cool, thereby fixing the diamond to the plates. Plates were examined visually for uniformity of bond formation and particles were probed by hand for qualitative assessment of bond strength. Plates were immersed in an electrochemical stripping bath containing Enstrip 5000 low pH stripping agent from Enthone Co. and electrically stripped with a current of 0.108 amp/cm² for up to about 8 hours as necessary to strip the bond from the plates. The stripping bath temperature was not controlled precisely in the range of about 28°–40° C. From time to time during stripping acid electrolyte was added to the plating bath to maintain a low pH. A visual evaluation of the state of the plate surface was made after electrochemical stripping. If bond remained, plates were sandblasted and the extent of sandblasting needed to return the surface to a bond-free state was noted.

Metal components used to make the bond compositions are listed in Table I. Compositions of the bond, braze conditions and results are summarized in Table II.

TABLE I

|  | Ag/Cu Alloy[1] g | Ag/Cu/Sn Alloy[2] g | Cu/Sn Alloy[3] g | TiH₂ Powder g |
|---|---|---|---|---|
| Ex. 1 | — | — | 100.00 | 9.0 |
| Ex. 2 | — | 8.30 | 91.70 | 8.0 |
| Ex. 3 | — | 16.70 | 83.30 | 7.0 |
| Ex. 4 | 23.0 | — | 77.0 | 7.0 |
| Ex. 5 | 28.6 | — | 71.40 | 7.0 |
| Ex. 6 | — | 33.30 | 66.70 | 7.0 |
| Ex. 7 | — | 58.30 | 41.70 | 6.0 |
| Ex. 8 | — | 58.30 | 41.70 | 6.0 |
| Ex. 9 | — | 91.70 | 8.30 | 6.0 |
| Ex. 10 | — | 91.70 | 8.30 | 6.0 |
| Ex. 11 | — | 100.00 | — | 6.0 |

[1] 72 wt% Ag/28 wt% Cu alloy powder
[2] 60 wt% Ag/30 wt% Cu/ 10 wt% Sn powder
[3] 77 wt% Cu/23 wt% Sn powder improvement of the copper/tin pre-alloy and titanium bond composition over the non-alloyed three component bond composition.

The bond compositions of Examples 2–11 were obtained by mixing various combinations of alloy powders described in Table I. Generally, the strippability of the bond improved and the amount of mechanical work needed to remove bond residue after electrochemical stripping reduced as the amount of silver increased in the bond composition.

Also the ability to reduce brazing temperature improved as silver content increased. Example 1 brazed at an acceptable temperature of 865° C. With about 10 parts silver per 100 parts Cu/Sn/Ti, (Ex. 3), brazing could be done successfully at 855° C. With 50 parts per hundred (Ex. 7) and 108 parts per hundred (Ex. 9), brazing below 800° C. was achieved. While strippability was excellent at these high silver content bond compositions and low brazing temperatures, bond strength did suffer somewhat For the same compositions, raising the brazing temperature to 820° C. (Exs. 8 and 10) produced strong bonds. Bond strength and strippability remained quite good at silver content of 131 parts per hundred.

Examples 12 to 21

Prepare bond compositions corresponding to Examples 2–11 of Table II, respectively, by blending separate silver, copper, tin and titanium hydride powders in the amounts shown in Table III to uniform dry powder blends. Repeat the procedure corresponding to Examples 2–11 to braze diamond grains on clean flat stainless steel test plates. In each of Examples 12–21, the diamond grains are firmly attached to the plate. Immerse the plates in an electrochemical metal

TABLE II

|  | Cu[1] | Sn[1] | Ti[1] | Ag[1] | Braze Temp °C. | Bond Strength | Electro-Chem Strip Rate[3] | Sandblast |
|---|---|---|---|---|---|---|---|---|
| Ex. 1 | 70.90 | 21.2 (21.2)[2] | 7.9 | — | 865.00 | Very strong | Slow | Some required |
| Ex. 2 | 71.80 | 21.3 (20.3) | 7.5 | 4.90 | 865.00 | Very strong | Slow | Less required than Ex. 1 |
| Ex. 3 | 71.40 | 21.6 (19.6) | 6.90 | 10.30 | 855.00 | Very strong | Slow | Less required than Ex. 2 |
| Ex. 4 | 72.90 | 19.6 (16.6) | 7.40 | 18.40 | 855.00 | Strong | Moderate | Light blasting required |
| Ex. 5 | 73.20 | 19.0 (15.3) | 7.80 | 23.90 | 855.00 | Strong | Moderate | Light blasting required |
| Ex. 6 | 70.80 | 21.4 (17.4) | 7.70 | 23.10 | 855.00 | Strong | Moderate | Light blasting required |
| Ex. 7 | 70.0 | 21.8 (14.6) | 8.20 | 49.40 | 775.00 | Moderate | Fast | None required |
| Ex. 8 | 70.0 | 21.8 (14.6) | 8.20 | 49.40 | 820.00 | Strong | Fast | None required |
| Ex. 9 | 66.70 | 21.8 (10.5) | 11.40 | 108.00 | 780.00 | Moderate | Fast | None required |
| Ex. 10 | 66.70 | 21.8 (10.5) | 11.40 | 108.00 | 820.00 | Strong | Fast | None required |
| Ex. 11 | 65.50 | 21.8 (9.4) | 12.70 | 131.00 | 820.00 | Strong | Fast | None required |

[1] parts by weight per 100 parts by weight total of Cu + Sn + Ti
[2] value in ( ) is wt% Sn in total Cu/Sn/Ti/Ag bond composition.
[3] "Slow" most bond remained and diamond firmly held at end of stripping period.
Mechanical removal of residue (sandblasting) was required to clean plate.
"Moderate" most diamond was removed or loosened substantially at end of stripping period.
Slight sandblasting was needed to remove residual bond from plate.
"Fast" diamond and bond were completely removed at end of stripping period and no sandblasting was needed.

Example 1 was produced from a mixture of copper/tin alloy and titanium hydride powders. The bond composition provided the strongest bond and least strippable of the tested compositions. Some sandblasting was needed to remove the bond and abrasive grains completely after electrochemical stripping. Mechanical removal after electrochemical stripping was needed, however, the amount of cleaning was notably less than was required to recover metal single layer diamond abrasive wheels bonds from bond composition mixtures of separate copper, tin and titanium hydride powders. These wheels required multiple cycles of electrochemical stripping and sandblasting to completely remove residual bond. Example 1 therefore demonstrates strippability stripping bath for 8 hours at up to about 40° C. Remove the plates from the bath and dry them. The electrochemical and sandblasting strippability is better than that required for copper, tin, titanium powder mixture bond composition. That is, repeated electrochemical and sandblast cycles is not required to clean the plates. However, Examples 12–21 need slightly more stripping effort than corresponding Examples 2–11.

TABLE III

|       | Ag g | Cu g  | Sn g  | TiH₂ Powder g |
|-------|------|-------|-------|---------------|
| Ex. 12 | 5.0  | 73.10 | 21.90 | 8.0 |
| Ex. 13 | 10.0 | 69.20 | 20.80 | 7.0 |
| Ex. 14 | 16.6 | 65.70 | 17.70 | 7.0 |
| Ex. 15 | 20.6 | 63.0  | 16.40 | 7.0 |
| Ex. 16 | 20.0 | 61.30 | 18.70 | 7.0 |
| Ex. 17 | 35.0 | 49.60 | 15.40 | 6.0 |
| Ex. 18 | 35.0 | 49.60 | 15.40 | 6.0 |
| Ex. 19 | 55.0 | 33.90 | 11.10 | 6.0 |
| Ex. 20 | 55.0 | 33.90 | 11.10 | 6.0 |
| Ex. 21 | 60.0 | 30.0  | 10.0  | 6.0 |

Example 22

Combine 20.0 g silver, 61.3 g copper, 18.7 g tin and 7.0 g titanium hydride powders of particle sizes less than 44 mm to form a uniform powder mixture. Charge the mixture to a crucible and heat the mixture under vacuum of less than 0.133 Pa pressure to fuse the components into an alloy then cool. Comminute the alloy to particles smaller than 44 mm. Add Braz™ binder to form a 25 wt % binder content paste and mix the the alloy paste to homogeneity.

Apply the paste in a thin layer to the rim of a clean, 10 cm diameter steel abrasive wheel core. Dust diamond grains onto the wet paste and shake off excess grains. Heat the abrasive wheel in an oven under vacuum atmosphere below 0.133 Pa pressure at a rate of 10° C. per minute to a temperature of 865° C. and maintain brazing at this temperature for 30 minutes. Cool the wheel to room temperature to obtain diamond grains firmly bonded to the core.

Suspend the wheel from an electrode in an electrochemical stripping bath at room temperature and apply an electric current of 0.108 amp/cm². After 8 hours remove then wash off and dry the stripped wheel. The bonded surface of the wheel is nearly completely free of residual bond and grit. Very slightly sandblast the wheel surface to remove all residual bond.

Examples 23 and 24

Single layer metal bond, diamond abrasive wheels were produced as follows. A mixture of of the same components as Example 4, i.e., 23 pbw of 72 wt % Ag/28 wt % Cu alloy powder; 77 pbw of 77 wt % Cu/23 wt % Sn alloy powder and 7.0 pbw titanium hydride was tumble blended to uniform concentration. The dry mixture was blended with Braz™ binder of Vitta Company to form a paste of 25 wt % binder concentration, (Ex. 23).

A second composition corresponding to Example 1 was also prepared by blending 100 pbw of 77 wt % copper/23 wt % tin alloy powder and 9.0 pbw titanium hydride powder to a blend composition of 70 wt % Cu, 21 Sn and 9 wt % Ti. The blend was also mixed to a 25 wt % paste composition with Braz™ binder, (Ex. 24).

The pastes were separately coated onto the rims of two 10.16 cm diameter steel abrasive wheel cores. Diamond abrasive of about 0.12–0.18 mm size was dusted on the pastes in a single layer. Excess abrasive grains were shaken off the wheels, which were oven dried to evaporate the liquid binder and to form "green" wheel precursors. The precursors where heated to 865° C. for 30 min. under low oxygen atmosphere of below 0.133 Pa pressure. During this time, titanium hydride dissociated to elemental titanium which liquefied with remaining components to coat the abrasives. The wheels were allowed to cool which caused the braze liquids to solidify and bond the abrasive to the cores.

The wheels were used to grind 23.32 cm×10.16 cm×2.54 cm high density (99.5%) alumina blocks from Coors Ceramics Co., Golden, Colo. The wheels were rotated to a surface speed of 25.4 m/s, and longitudinal speed was 2.54 cm/s. The blocks were cut for a length to a depth of 0.432 mm. In the trials the wheels performed at similar levels of power and normal force. Both wheels wore out due to fracture and flattening of the diamond grains. Very little diamond loss (less than 5 grits per wheel) was observed indicating that bond strength of the novel wheel compared favorably with the conventional wheel. These examples show that the novel bonds were able to deliver very good grinding performance. Taken with the strippability results of Examples 4 and 1, respectively, Examples 23 and 24 show that the novel bond compositions provide superior combinations of strength, cutting ability and ease of stripping for recovery of spent abrasive tools.

What is claimed is:

1. A strippable bond composition for an abrasive tool having a predominantly iron core consisting essentially of:
    (a) about 85–95 wt % bronze alloy of about 5.6–41.2 wt % tin and about 58.8–94.6 wt % copper; and
    (b) about 5–15 wt % titanium.

2. The strippable bond composition of claim 1 wherein the bond composition is about 70 wt % copper, about 21 wt % tin and about 9 wt % titanium.

3. The strippable bond composition of claim 1 wherein each of the bronze alloy and titanium components is powder of particle size smaller than about 44 μm and the titanium component is titanium hydride.

4. The strippable bond composition of claim 3 wherein the bond composition further consists essentially of a fugitive liquid binder in an effective amount to form a paste.

5. A method of bonding an abrasive grit to a tool having a predominantly iron core, comprising the steps of:
    (1) blending to a uniform mixture a powder of bronze alloy consisting essentially of about 5.6–41.2 wt % tin and a complementary amount of copper; and a powder of titanium hydride; wherein the powders are present in proportions effective to obtain a bond composition consisting essentially of
        (i) about 50–90 wt % copper;
        (ii) about 5–35 wt % tin; and
        (iii) about 5–15 wt % titanium;
    (2) placing abrasive grains and the bond composition on a cutting surface of the core;
    (3) heating the bond composition to an elevated temperature below a brazing temperature of at most about 870° C. in a substantially oxygen free atmosphere the heating being effective to cause the titanium hydride to dissociate to elemental titanium; and
    (4) further heating the bond composition to the brazing temperature for a duration effective to liquefy a major fraction of the composition.

6. The method of claim 5 wherein the placing step includes blending an effective amount of fugitive liquid binder in the bonding composition to form a paste; coating the cutting surface with a layer of the paste; and depositing abrasive grains in the paste.

7. The method of claim 5 wherein the placing step includes depositing glue-coated grains on the cutting surface followed by covering the grains with the bond composition.

8. The method of claim 5 wherein the grains are deposited in a substantially single layer.

9. The method of claim 8 wherein the brazing temperature is in the range of about 850°–865° C.

10. The method of claim 8 wherein the abrasive grains are a superabrasive selected from the group consisting of diamond, cubic boron nitride and a mixture of them.

11. The method of claim 8 wherein the abrasive tool is a wheel.

12. The method of claim 11 wherein the bronze alloy is about 23 wt % tin and the bond composition is about 70 wt % copper, about 21 wt % tin and about 9 wt % titanium.

13. A single layer metal bonded abrasive tool comprising:
 (a) a predominantly iron core; and
 (b) abrasive grit bonded to the core by a brazed bond composition consisting essentially of
  (i) about 85–95 wt % bronze alloy of about 5.6–41.2 wt % tin and about 58.8–94.4 wt % copper; and
  (ii) about 5–15 wt % titanium.

14. The single layer metal bonded abrasive tool of claim 13 wherein the bond composition is about 70 wt % copper, 21 wt % tin and about 9 wt % titanium.

15. An abrasive tool having a predominantly iron core, wherein the tool is produced by a process comprising the steps of
 (1) blending to a uniform mixture a powder of bronze alloy consisting essentially of about 5.6–41.2 wt % tin and a complementary amount of copper; and a powder of titanium hydride; wherein the powders are present in proportions effective to obtain a bond composition consisting essentially of
  (i) about 50–90 wt % copper;
  (ii) about 5–35 wt % tin; and
  (iii) about 5–15 wt % titanium;
 (2) placing abrasive grains and the bond composition on a cutting surface of the core;
 (3) heating the bond composition to an elevated temperature below a brazing temperature of at most 870° C. in a substantially oxygen free atmosphere, the heating being effective to cause the titanium hydride to dissociate to elemental titanium; and
 (4) further heating the bond composition to the brazing temperature for a duration effective to liquefy a major fraction of the bond composition.

16. The abrasive tool of claim 15 wherein the brazing temperature is in the range of about 820°–865° C.

17. The abrasive tool of claim 15 wherein the abrasive grains are a superabrasive selected from the group consisting of diamond, cubic boron nitride and a mixture of them.

18. The abrasive tool of claim 17 wherein the abrasive grit is deposited in a substantially single layer.

19. The abrasive tool of claim 18 wherein the bronze alloy is about 23 wt % tin and the bond composition is about 70 wt % copper, about 21 wt % tin and about 9 wt % titanium.

20. The abrasive tool claim 15 wherein the abrasive tool is a wheel.

\* \* \* \* \*